United States Patent
Zhang et al.

(10) Patent No.: US 11,393,256 B2
(45) Date of Patent: Jul. 19, 2022

(54) METHOD AND DEVICE FOR LIVENESS DETECTION, AND STORAGE MEDIUM

(71) Applicant: BEIJING SENSETiME TECHNOLOGY DEVELOPMENT CO., LTD., Beijing (CN)

(72) Inventors: Rui Zhang, Beijing (CN); Wukui Yang, Beijing (CN); Kai Yang, Beijing (CN); Mingyang Liang, Beijing (CN); Xiaoyang Guo, Beijing (CN); Liwei Wu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/040,855

(22) PCT Filed: Sep. 24, 2019

(86) PCT No.: PCT/CN2019/107584
§ 371 (c)(1),
(2) Date: Sep. 23, 2020

(87) PCT Pub. No.: WO2020/134238
PCT Pub. Date: Jul. 2, 2020

(65) Prior Publication Data
US 2021/0027081 A1    Jan. 28, 2021

(30) Foreign Application Priority Data
Dec. 29, 2018 (CN) .......................... 201811654149.6

(51) Int. Cl.
*G06V 40/40* (2022.01)
*G06T 7/55* (2017.01)
*G06V 40/16* (2022.01)

(52) U.S. Cl.
CPC ................ *G06V 40/45* (2022.01); *G06T 7/55* (2017.01); *G06V 40/166* (2022.01);
(Continued)

(58) Field of Classification Search
CPC ........... G06K 9/00906; G06K 9/00255; G06K 9/00268; G06K 9/6273; G06K 9/00288;
(Continued)

(56) References Cited

U.S. PATENT DOCUMENTS 10,372,974 B2 * 8/2019 Price ..................... H04N 5/2258
2011/0102553 A1 * 5/2011 Corcoran ............. G06K 9/4661
348/50
(Continued)

FOREIGN PATENT DOCUMENTS

CN    104766063 A    7/2015
CN    105023010 A    11/2015
(Continued)

OTHER PUBLICATIONS

"Face Anti-Spoofing Based on Robust Loss Face Alignment and Binocular Measuring"; Sep. 2018; Yizhe Li; (China Dissertation Database), 71 pgs.
(Continued)

*Primary Examiner* — Phuoc Tran
(74) *Attorney, Agent, or Firm* — Cooper Legal Group, LLC

(57) ABSTRACT

The embodiments disclose a method and device for liveness detection and a computer-readable storage medium. The method includes that: a first image collected by a first image sensor of a binocular camera is acquired, and a second image collected by a second image sensor of the binocular camera is acquired: binocular matching processing is performed on the first image and the second image to obtain parallax information of the first image and the second image; and a
(Continued)

liveness detection result is obtained according to the parallax information. By adopting the embodiments of the present disclosure, the accuracy of liveness detection can be improved.

19 Claims, 7 Drawing Sheets

(52) U.S. Cl.
CPC .. *G06V 40/168* (2022.01); *G06T 2207/20081* (2013.01); *G06T 2207/20084* (2013.01); *G06T 2207/30201* (2013.01)

(58) Field of Classification Search
CPC .... G06K 9/00228; G06K 9/6288; G06T 7/55; G06T 2207/20081; G06T 2207/20084; G06T 2207/30201
See application file for complete search history.

(56) References Cited

U.S. PATENT DOCUMENTS

2017/0061251 A1   3/2017  Fan et al.
2020/0210690 A1*  7/2020  Han ...................... G06T 7/593

FOREIGN PATENT DOCUMENTS

| CN | 106407914 A | 2/2017 |
|----|-------------|--------|
| CN | 107403168 A | 11/2017 |
| CN | 108764091 A | 11/2018 |
| CN | 108921041 A | 11/2018 |
| CN | 108961327 A | 12/2018 |
| JP | 2003178306 A | 6/2003 |
| JP | 2004192378 A | 7/2004 |
| JP | 2017016192 A | 1/2017 |
| KR | 20170051392 A | 5/2017 |
| TW | 200707310 A | 2/2007 |

OTHER PUBLICATIONS

International Search Report in the international application No. PCT/CN2019/107584, dated Dec. 20, 2019, 3 pgs.
First Office Action of the Japanese application No. 2020-552736, dated Nov. 24, 2021, 8 pgs.
English translation of the Written Opinion of the International Search Authority in the international application No. PCT/CN2019/107584, dated Dec. 20, 2019, 4 pgs.

* cited by examiner

METHOD AND DEVICE FOR LIVENESS DETECTION, AND STORAGE MEDIUM

CROSS-REFERENCE TO RELATED APPLICATION

This application is filed based upon and claims priority from Chinese patent application No. 201811654149.6, filed on Dec. 29, 2018, the disclosure of which is hereby incorporated by reference in its entirety.

TECHNICAL FIELD

The disclosure relates to the field of computer vision, and particularly to a method and a device for liveness detection and a storage medium.

BACKGROUND

Face anti-spoofing is an important issue in the technical fields of information security and anti-spoofing. An important research direction of face anti-spoofing is liveness detection. Liveness detection refers to judging, by using a computer vision technology, whether a face image in front of a camera is from a real person. At present, binocular-camera-based liveness detection has been successfully applied to many scenarios. These scenarios cover a quite large range, environmental factors of the scenarios include multiple factors such as a background, illuminance, a distance and a motion, and consequently, it is very difficult to improve the performance of a liveness detection algorithm. There is an urgent need for seeking a solution for improving the accuracy of a liveness detection algorithm.

SUMMARY

The disclosure provides a method and a device for liveness detection and storage medium.

A first aspect discloses a method for liveness detection, which may include that: a first image collected by a first image sensor of a binocular camera is acquired, and a second image collected by a second image sensor of the binocular camera is acquired; binocular matching processing is performed on the first image and the second image to obtain disparity information between the first image and the second image; and a liveness detection result is obtained according to the disparity information.

A second aspect discloses another method for liveness detection, which may include that: a first image collected by a first image sensor of a binocular camera and a second image collected by a second image sensor of the binocular camera are acquired; and liveness detection processing is performed on the first image and the second image through a liveness detection neural network to obtain a liveness detection result, the liveness detection neural network being obtained by training based on disparity information of sample image pairs.

A third aspect discloses another method for liveness detection, which includes that: a first target region image of a target object is acquired from a first image collected by a first image sensor of a binocular camera, and a second target region image of the target object is acquired from a second image collected by a second image sensor of the binocular camera; and the first target region image and the second target region image are input to a liveness detection neural network, and liveness detection processing is performed to obtain a liveness detection result, the liveness detection neural network being obtained by training based on disparity information of sample image pairs.

A fourth aspect discloses a device for liveness detection, which may include: an acquisition module, configured to acquire a first image collected by a first image sensor of a binocular camera and acquire a second image collected by a second image sensor of the binocular camera; a binocular matching module, configured to perform binocular matching processing on the first image and the second image to obtain disparity information between the first image and the second image; and a liveness detection module, configured to obtain a liveness detection result according to the disparity information.

A fifth aspect discloses another method for liveness detection, which may include: an acquisition module, configured to acquire a first image collected by a first image sensor of a binocular camera and a second image collected by a second image sensor of the binocular camera; and a liveness detection module, configured to perform liveness detection processing on the first image and the second image through a liveness detection neural network to obtain a liveness detection result, the liveness detection neural network being obtained by training based on disparity information of sample image pairs.

A sixth aspect discloses a device for liveness detection, which may include a processor and a memory. The memory may be configured to store a computer program code. The processor may be configured to call the computer program code to execute the method in the first or second or third aspect or any possible implementation of the first or second or third aspect.

A seventh aspect discloses a computer-readable storage medium having stored computer-readable instructions that when called by a processor, enable the processor to execute the method in the first aspect or any possible implementation of the first aspect.

An eighth aspect provides a computer program product including computer instructions, the computer instructions being called to enable a computer device to execute the method in the first aspect or any possible implementation of the first aspect.

In embodiments of the disclosure, the first image collected by the first image sensor of the binocular camera is acquired, and the second image collected by the second image sensor of the binocular camera is acquired; binocular matching processing is performed on the first image and the second image to obtain the disparity information between the first image and the second image; and the liveness detection result is obtained according to the disparity information. In the method for liveness detection, the disparity information predicted in a binocular matching algorithm is added, so that the liveness detection accuracy may be improved.

DETAILED DESCRIPTION

The technical solutions in the embodiments of the disclosure will be clearly and completely described below in conjunction with the drawings in the embodiments of the disclosure. It is apparent that the described embodiments are not all embodiments but only part of embodiments of the disclosure. All other embodiments obtained by those of ordinary skill in the art based on the embodiments in the disclosure without creative work shall fall within the scope of protection of the disclosure.

It is also to be understood that terms used in the specification of the disclosure are not intended to limit the disclosure but are intended only to describe specific embodiments.

It is further to be understood that term "and/or" used in the specification and appended claims of the disclosure refers to one or any combination and all possible combinations of more of associated items that are listed and these combinations are included.

During specific implementation, the technical solutions described in the embodiments of the disclosure may be implemented by a terminal device or server or electronic device of another type with an image processing function, for example, a mobile phone, a desktop computer, a laptop computer and a wearable device. No limits are made herein. For convenient understanding, an execution body of the method for liveness detection is called as a device for liveness detection hereinafter.

The embodiments of the disclosure provide a method for liveness detection, which includes that: a first image collected by a first image sensor of a binocular camera is acquired, and a second image collected by a second image sensor of the binocular camera is acquired; binocular matching processing is performed on the first image and the second image to obtain disparity information between the first image and the second image; and a liveness detection result is obtained according to the disparity information.

The embodiments of the disclosure also provide a corresponding device for liveness detection and a computer-readable storage medium. Detailed descriptions will be made below respectively.

Figures 1, 2:
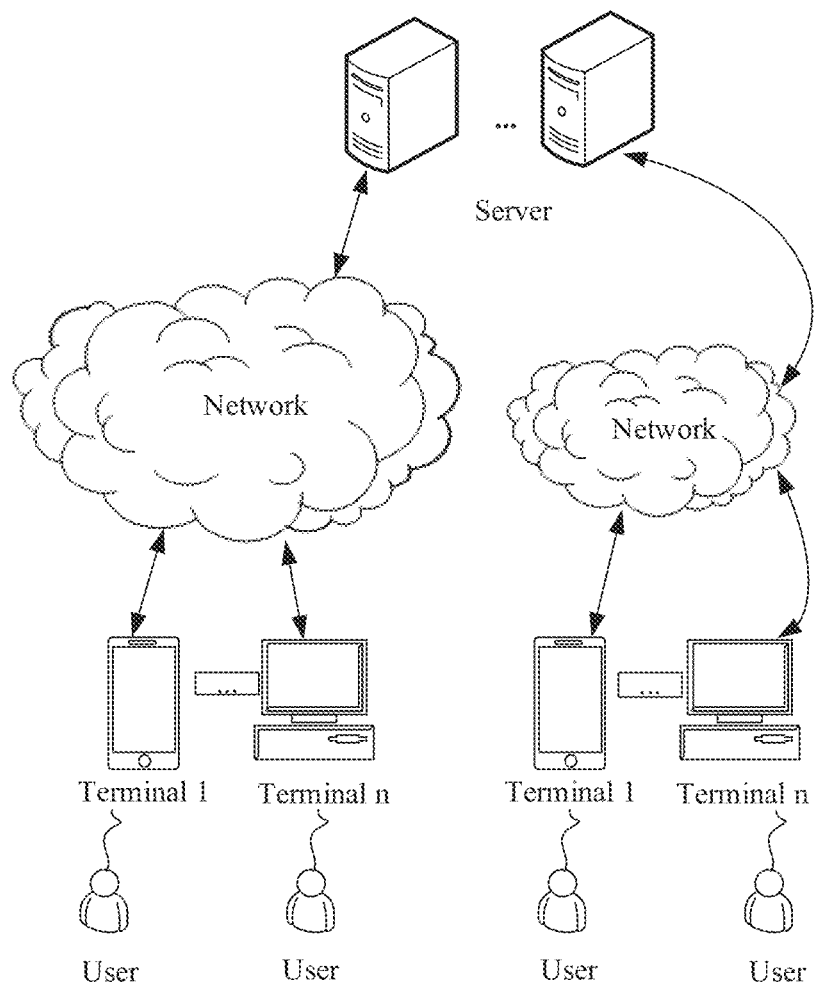
FIG. 1 is a structure diagram of a liveness detection system according to an embodiment of the disclosure.
FIG. 2 is a flowchart of a method for liveness detection according to an embodiment of the disclosure.

Referring to FIG. 1, FIG. 1 is an exemplary structure diagram of an application system of the technical solutions provided in the embodiments of the disclosure. As illustrated in FIG. 1, the liveness detection system may include one or more servers and multiple terminal devices.

The server may communicate with the terminal device through the Internet. Specifically, the terminal device is provided with a cross-modality binocular camera. The terminal device collects an image pair or a video sequence through the binocular camera and sends the collected image pair or an image pair obtained by performing frame selection on the video sequence to the server, or may further process the image pair, for example, performing feature extraction, and send a processing result to the server. The server, after receiving the image pair or the processing result of the image pair from the terminal device, may perform liveness detection based on received information and send a liveness detection result or an operating instruction obtained based on the liveness detection result to the terminal device.

The server may include, but is not limited to, a background server, a component server, a liveness detection system server or a liveness detection software server, etc. The server sends the liveness detection result to the terminal. A related client (for example, a liveness detection client) may be installed and run in the terminal device. The client refers to a program corresponding to the server and providing local service for a user. Herein, the local service may include, but is not limited to, uploading an image, providing a data collection interface and a liveness detection result display interface, and the like.

For example, the client may include a locally running application program, a function running in a web browser (also called a Web App) and the like. For the client, a corresponding server program is required to run in the server to provide one or more corresponding functions of cross-modality image processing, cross-modality image feature extraction, cross-modality binocular matching, cross-modality binocular matching-based liveness detection and the like.

In the embodiments of the disclosure, the terminal device may include, but is not limited to, any intelligent operating system-based electronic product such as a smart phone, a tablet computer and a personal computer and may perform human-computer interaction with the user through an input device such as a keyboard, a virtual keyboard, a touchpad, a touch screen and a voice-operated device. The intelligent operating system includes, but is not limited to, any operating system providing various mobile applications, for the terminal device to enrich functions of the device, for example, Android, iOS™, Windows Phone.

It is to be noted that the structure of the liveness detection system to which the embodiments of the disclosure are applicable is not limited to the example illustrated in FIG. 1.

The method for liveness detection provided in the embodiments of the disclosure will be described below in conjunction with FIG. 2.

The method for liveness detection provided in the embodiments of the disclosure may be applied to various terminal devices. The terminal device may include a security device for guarding, a ticket device for ticketing detection, a payment device for paying, an access control device for access control and the like.

For example, a security device may be arranged at a self-service security checkpoint, and the method for liveness detection provided in the embodiments of the disclosure may be implemented to enable a person authorized to pass through the security checkpoint and to reduce the phenomenon that an unauthorized person passes through the security checkpoint by holding a picture of an authorized person.

In another example, when ticketing detection is performed via face recognition and the like, the phenomena of ticket dodging are reduced by using liveness detection.

During payment, a mobile phone, a Point-Of-Sale (POS) terminal or the like may reduce the phenomena of payment fraud by using liveness detection.

In some other embodiments, the method for liveness detection provided in the embodiments of the disclosure may be applied to the server. The server may be a server in a cloud platform or an application platform. For example, the first image and the second image, after being collected by the binocular camera, are transmitted to the server; and the server executes the method for liveness detection provided in the embodiments of the disclosure to obtain a liveness detection result, and then returns the liveness detection result to the terminal device. Therefore, the terminal device may determine the liveness detection result as a verification result for execution of a predetermined operation. For example, the security device, after receiving the liveness detection result from the server, executes, according to the liveness detection result representing whether liveness verification succeeds or not, a ticketing operation, a payment operation and/or an access control operation, etc.

In S100, a first image collected by a first image sensor of a binocular camera is acquired, and a second image collected by a second image sensor of the binocular camera is acquired.

The binocular camera includes two cameras, i.e., the first image sensor and the second image sensor. In some embodiments, the first image sensor and the second image sensor may be sensors of the same type, namely the first image sensor and the second image sensor may be image sensors of a same modality and the binocular camera is a co-modality binocular camera. In some embodiments, the first image sensor and the second image sensor may be sensors of different types, namely the first image sensor and the second image sensor may be image sensors of different modalities, and the binocular camera is a cross-modality binocular camera. No limits are made thereto in the embodiments of the application. The cross-modality first image sensor and second image sensor may refer to different image generation principles or mechanisms. For example, the first image sensor may be a visible light image sensor and is capable of forming an image based on visible light; and the second image sensor is a non-visible light image sensor, such as, for example, an infrared image sensor and an ultraviolet image sensor. The first image sensor and second image sensor of different modalities may collect features of different layers, thereby providing more features for liveness verification.

In a possible implementation, the first image sensor and second image sensor in the binocular camera may be calibrated in advance. A calibration method for the binocular camera may be a conventional camera calibration method, an active vision camera calibration method, a camera self-calibration method or the like. Specific implementation of calibration is not limited herein.

In a possible implementation, the first image sensor and the second image sensor include one of a visible light image sensor, a near infrared image sensor, a dual-channel image sensor and the like. The visible light image sensor is an image sensor irradiating an object by using visible light to form an image. The near infrared image sensor is an image sensor irradiating an object by using near infrared rays to form an image. The dual-channel image sensor is an sensor forming an image by using a dual-channel (including a Red (R) channel) imaging principle. The two image sensors in the binocular camera may be image sensors of the same type, or may be image sensors of different types. For example, two image sensors of a binocular camera A are a near infrared image sensor and a dual-channel image sensor respectively. In another example, two image sensors of a binocular camera B are a visible light image sensor and a near infrared image sensor respectively. In another example, two cameras of a binocular camera C are a visible light image sensor and a dual-channel image sensor respectively. The image sensor in the embodiment of the disclosure may also be an image sensor of another type. Types of the two image sensors in the binocular camera may be selected according to a practical application requirement. No limits are made thereto in the embodiment of the disclosure.

In the embodiment of the disclosure, the first image and the second image are collected through the binocular camera. A pair of static images may be shot by the first image sensor and the second image sensor, or a continuous video stream may be shot by the first image sensor and the second image sensor, and then one or more pairs of image frames are selected from the shot video stream. Accordingly, the first image and the second image may be static images or video frame images. No limits are made thereto in the embodiment of the disclosure.

In some embodiments, the first image and the second image are a left-view image and a right-view image respectively, or the first image and the second image are a right-view image and a left-view image respectively, or the first image and the second image are other types of images collected by the binocular camera. No limits are made thereto in the embodiment of the disclosure.

In the embodiment of the disclosure, there may be multiple possible implementations for S100. For example, the binocular camera is arranged in a device for liveness detection, and the device for liveness detection performs image collection through the binocular camera. Image collection is performed through the binocular camera to obtain an image pair including the first image and the second image. Or, a video sequence may be obtained by image collection, and in such case, a frame selection operation is executed on the video sequence to obtain the image pair including the first image and the second image. No limits are made thereto in the embodiment of the disclosure.

In some other possible implementations, the device for liveness detection acquires the first image and second image stored in an image library. The image library may be set in the device for liveness detection or another device. No limits are made thereto in the embodiment of the disclosure.

In some other possible implementations, the device for liveness detection receives the first image and second image sent by the other device. In an example, the device for liveness detection receives the first image and second image sent by a terminal device provided with a binocular camera. In some embodiments, the terminal device may send the image pair including the first image and the second image to the device for liveness detection (for example, a server) or send a video sequence including the first image and the second image, and in such case, the device for liveness detection performs frame selection on the received video sequence to obtain the image pair including the first image and the second image. Or, the terminal device may send feature data of the first image and feature data of the second image to the device for liveness detection, and correspondingly, the device for liveness detection receives the feature data of the first image and the feature data of the second image from the terminal device and performs liveness detection based on the received feature data. In some embodiments, information sent by the terminal device may be contained in a liveness detection request or an aerial view generation request or a message of another type. No limits are made thereto in the embodiment of the disclosure.

In S200, disparity information between the first image and the second image is obtained based on the first image and the second image.

The disparity information may include, but is not limited to, information indicating a difference between collection viewing angles of the first image and the second image.

In some embodiments, feature extraction is performed on the first image and the second image to obtain first feature data and second feature data respectively, and the disparity information between the first image and the second image is obtained based on the first feature data and the second feature data.

In some embodiments, a first target region image is acquired from the first image, a second target region image is acquired from the second image, and then the disparity information between the first image and the second image is obtained based on the first target region image and the second target region image.

In some embodiments, feature extraction may be directly performed on the first image and the second image. For example, the first image and the second image are input to a neural network for feature extraction processing. In some other embodiments, feature extraction may be performed on part of the first image and the second image. For example, the first target region image and the second target region image are acquired from the first image and the second image respectively, and feature extraction is performed on the first target region image and the second target region image. In an example, the first target region image and the second target region image are input to the neural network, and feature extraction is performed to obtain the first feature data and the second feature data. However, no limits are made thereto in the embodiment of the disclosure.

In the embodiment of the disclosure, the target region image may be acquired in multiple manners. In some embodiments, target detection is performed on the first image to obtain a first target region, and the first target region image is clipped from the first image based on the first target region. An electronic device may detect the target object in the first image by using technologies of image recognition and the like, or may input the first image to the neural network to detect the target object. No limits are made thereto in the embodiment of the disclosure.

Figure 3:
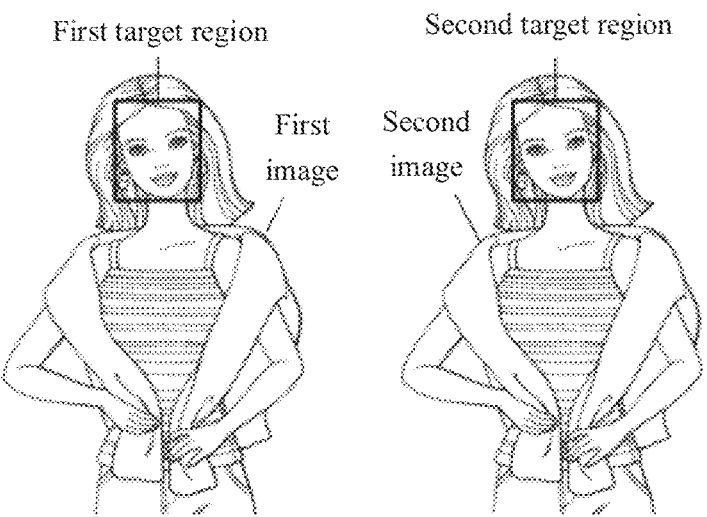
FIG. 3 is a schematic diagram of target detection according to an embodiment of the disclosure.

Referring to FIG. 3, FIG. 3 is a schematic diagram of an example of target detection according to an embodiment of the disclosure. It is assumed that the target object is a face. As illustrated in FIG. 3, target detection is performed on the first image and the second image to obtain the first target region and a second target region respectively, i.e., rectangular boxes illustrated in FIG. 3, then an image of the first target region may be clipped from the first image to obtain the first target region image, and an image of the second target region is clipped from the second image to obtain the second target region image.

In another example, after the target object in the first image is detected to obtain a first region where the target object is located, the first region is magnified by preset times to obtain the first target region, and the image of the first target region is clipped from the first image.

In some other optional examples, key point detection may be performed on the first image to obtain first key point information of the target object, and the first target region image is clipped from the first image based on the first key point information of the target object.

In some optional examples, target detection is performed on the first image to obtain a first candidate region of the target object, key point detection is performed on an image of the first candidate region to obtain the first key point information of the target object, and the first target region image is clipped from the first image based on the first key point information of the target object.

In some embodiments, the first target region where the target object is located in the first image may be obtained based on the first key point information of the target object, and image clipping is performed based on the first target region.

In some embodiments, the first key point information may include information of positions of multiple key points of the target object and the like. A region including the target object, i.e., the first target region, may be obtained based on the first key point information of the target object. And the first target region may be a rectangle or an ellipse similar to a face contour. In some examples, the first target region is a minimum region including the complete target object or is obtained based on the minimum region including the target object. For example, the first target region is obtained by magnifying a minimum rectangle including a complete face, but no limits are made thereto in the embodiment of the disclosure. A position of the region where the target object is located may be obtained more accurately based on the key point information, so that the liveness detection accuracy is improved.

In some embodiments, similar processing may be performed on the second image. For simplicity, elaborations are omitted herein.

In the embodiment of the disclosure, the target object may include various types of objects or a part of an object, for example, a face, a road, a motor vehicle, a pedestrian and an animal. No limits are made thereto in the embodiment of the disclosure.

In the embodiment of the disclosure, the target region image is an image of the region where the target object is located in the image. In some embodiments, the target object may be a face, and correspondingly, the first target region image and the second target region image are facial region images. However, the embodiment of the disclosure is not limited thereto.

In some embodiments, the first target region image and the second target region image have the same size. For example, image clipping is performed on the first image and the second image by using rectangular boxes with the same size respectively. However, no limits are made thereto in the embodiment of the disclosure.

In an example, it is assumed that the target object is a face. Face detection is performed on the first image to obtain a position of a face region, for example, obtaining a coordinate of a rectangular box of the face region. Then, face key point detection is performed on an image of the face region, which is obtained through face detection, to obtain position information of multiple key points of the face in the image, for example, coordinates of 106 key points. Face region segmentation is performed based on the position information of the multiple key points of the face, namely a minimum rectangle including the face in the image is determined by using the coordinates of the key points of the face in the image, and the rectangular face region is determined as a final face region. In some embodiments, two face images with the same size may be clipped from two images respectively.

In some other embodiments, the device for liveness detection acquires the first target region image and the second target region image from another device and obtains the disparity information based on the first target region image and the second target region image.

A feature extraction algorithm adopted in the embodiment of the disclosure may be scale invariant feature transform, speed-up robust feature, histogram of oriented gradients, difference of Gaussian or the like. Correspondingly, the extracted feature data may include one or more of a local binary pattern feature, a histogram of sparse code feature, a color feature, a global feature, a region feature, a detail feature and the like. Specific implementation of feature extraction is not limited herein.

In some embodiments, feature extraction processing may be performed on the first target region image and the second target region image by using different feature extraction algorithms. For example, if scale invariant feature transform is selected for feature extraction of the first target region image, another feature extraction algorithm such as speed-up robust feature, histogram of oriented gradients and difference of Gaussian is selected for feature extraction of the second target region image.

In some embodiments, the first target region image and/or the second target region image may be preprocessed to enable the first target region image and the second target region image to have a unified distribution, and then feature extraction processing is performed on the first target region image and the second target region image by using the same feature extraction algorithm. No limits are made veto in the embodiment of the disclosure.

In some embodiments, feature extraction is performed on the first target region image and the second target region image through a trained binocular matching neural network such as a Convolutional Neural Network (CNN) and a Recurrent Neural Network (RNN). A type and specific implementation of the neural network are not limited in the embodiment of the disclosure. In a neural network example provided in the embodiment of the disclosure, the neural network includes an input layer, hidden layers and an output layer, and there may be n hidden layers, and n is a positive integer greater than 1. Some layers in the hidden layers may be configured for feature extraction, and an activation value of a certain layer in the hidden layers may represent an extracted feature.

Figure 4:
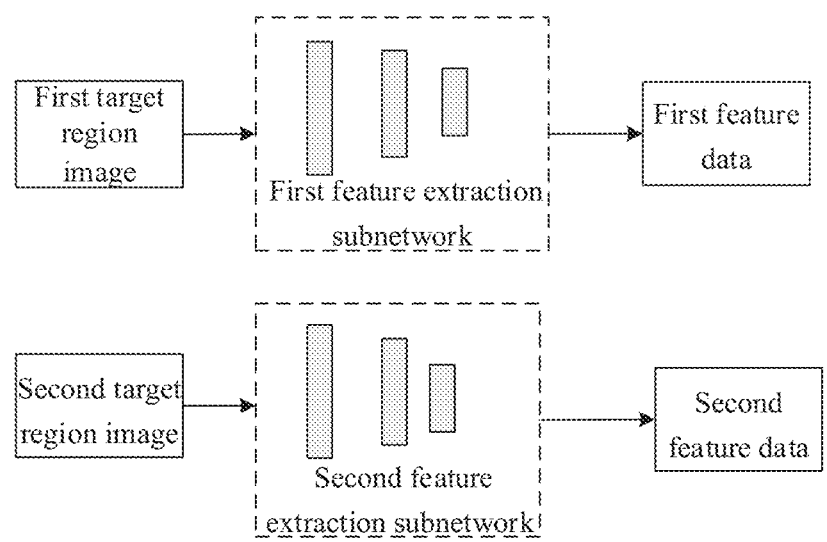
FIG. 4 is a flowchart of cross-modality feature extraction according to an embodiment of the disclosure.

In some embodiments, feature extraction processing is performed on the first target region image and the second target region image by using different subnetworks in the binocular matching neural network respectively. In an example illustrated in FIG. 4, feature extraction is performed on the first target region image by using a first feature extraction subnetwork in the binocular matching neural network to obtain the first feature data, and feature extraction is performed on the second target region image by using a second feature extraction subnetwork in the binocular matching neural network to obtain the second feature data. Weights of the first feature extraction subnetwork and the second feature extraction subnetwork are not shared, so that the first feature extraction subnetwork and the second feature extraction subnetwork may learn features of images of corresponding modalities in a training process respectively. Compared with a manner of performing feature extraction on the first target region image and the second target region image through neural networks of which weights are shared, this manner is favorable for implementing correct semantic expression of the images with the extracted features to further improve the image processing performance.

In some embodiments, the first feature extraction subnetwork and the second feature extraction subnetwork may have the same structure but different network parameters. For example, the first feature extraction subnetwork and the second feature extraction subnetwork have the same network hyper-parameter, for example, the numbers of included network layers and network layer structures are the same, but parameters of one or more network layers are different. In some embodiments, the first feature extraction subnetwork and the second feature extraction subnetwork may have different structures, for example, the network layer structures and/or the numbers of the included network layers are different. However, no limits are made thereto in the embodiment of the disclosure.

In some embodiments, for mapping the first target region image and the second target region image to the same feature space through the first feature extraction subnetwork and the second feature extraction subnetwork respectively, a feature regulation loss may be introduced to the training process of the binocular matching neural network to make feature data of matched pixels, in the two images similar, for example, making feature vectors similar. For example, it is assumed that the left-view image of a Near Infrared Ray (NIR) image and the right-view image is a Red, Green and Blue (RGB) image. The feature regulation loss may be determined in the following manner: a feature of the right-view image is converted to a left viewing angle based on labeling information or a predicted disparity, and the feature regulation loss is obtained based on a distance, for example, a distance L1, between the converted feature and a feature of the left-view image. However, the embodiment of the disclosure is not limited thereto.

Figure 5:
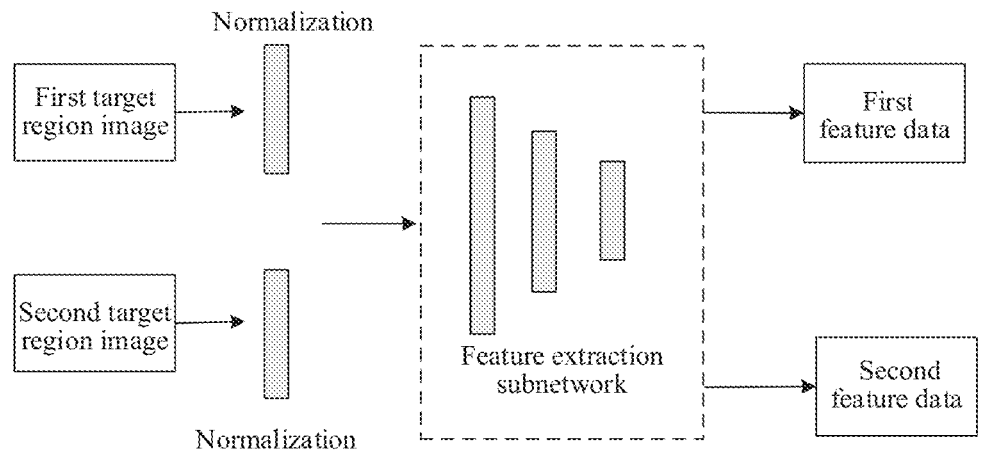
FIG. 5 is another flowchart of cross-modality feature extraction according to an embodiment of the disclosure.

In some embodiments, feature extraction is performed on the first target region image and the second target region image by using the same feature extraction network. For example, as illustrated in an example in FIG. 5, normalization processing is performed on the first target region image and the second target region image to enable a unified distribution of the normalized first target region image and second target region image respectively, then feature extraction is performed on the normalized first target region image by using a feature extraction subnetwork in the binocular matching neural network to obtain the first feature data, and feature extraction is performed on the normalized second target region image by using the feature extraction subnetwork to obtain the second feature data.

In some embodiments, normalization processing may be implemented by Instance Norm (IN) or batch normalization to enable the normalized first target region image and second target region image to have a unified distribution as much as possible. In an example, the following normalization processing may be performed on the first target region image and the second target region image:

$$Y_{ncwh} = \frac{x_{ncwh} - \mu_{ncwh}}{\sqrt{\sigma^2_{ncwh}}}. \tag{1}$$

$x_{ncwh}$ represents an input image, $Y_{ncwh}$ represents a normalized input image, n represents the number of images input at one time, c represents the channel number of the image, for example, the channel number of an RGB image is 3, w and h represent a width and height of the image respectively, $\mu_{ncwh}$ is an average of the input image, and $\sigma_{ncwh}^2$ is a standard variance of the input image. In such a manner, after normalization processing, feature extraction may be performed on the first target region image and the second target region image by using feature extraction subnetworks of which weights are shared (i.e., the same feature extraction subnetwork), so that the network complexity is reduced.

In the embodiment of the disclosure, the neural network may include a Deep Neural Network (DNN), a CNN, an RNN or the like. Enumerations are omitted in the embodiment of the disclosure.

It is also to be noted that the neural network may be locally trained by the device for liveness detection, or may be a network model called by an image processing device and trained by a third party, etc. No limits are made herein.

It is to be understood that descriptions are made above with the condition that feature extraction is performed on the first target region image and the second target region image to obtain the first feature data and the second feature data as an example. In some embodiments, feature extraction may be performed on the first image and the second image in a similar manner to obtain the first feature data and the second feature data respectively. For simplicity, elaborations are omitted herein.

In some embodiments, after the first feature data and the second feature data are obtained, a cost volume between the first feature data and the second feature data is determined, and the disparity information is obtained based on the cost volume.

The first target region image and the second target region image are corresponding images. Two images involved in binocular matching are shot from the same object or scene, and the two images are shot by two cross-modality cameras, so that features extracted from the two images represent features of the same object or scene. Matching calculation is performed based on the first feature data and the second feature data to obtain a disparity.

In some embodiments, an association graph of each disparity level is calculated to construct the cost volume.

In some embodiments, if the disparity between the first image and the second image has N possible numerical values, cost volumes may be determined based on each of the N possible numerical values, and the disparity value corresponding to a minimum in the obtained cost volumes is determined as the disparity information.

In the embodiment of the disclosure, the cost volume may be determined in another manner. No limits are made thereto in the embodiment of the disclosure.

After the cost volume is obtained, the disparity information may be determined in multiple manners. In some embodiments, feature extraction processing is performed on the cost volume to obtain third feature data, and the disparity information is obtained based on the third feature data.

In a possible implementation, the cost volume is input to a disparity prediction neural network and processed to obtain the disparity information.

In some embodiments, the disparity information is determined based on the cost volume and at least one of the first feature data and the second feature data.

In some embodiments, the first image sensor is a near infrared camera or a dual-channel camera, and correspondingly, the disparity information is determined based on the cost volume and the first feature data.

In some embodiments, fusion processing is performed on the cost volume and at least one of the first feature data and the second feature data to obtain fused data, and the disparity information is determined based on the fused data. Herein, fusion processing may be fusion according to connection of channels or fusion in another manner. No limits are made thereto in the embodiment of the disclosure.

In some embodiments, the cost volume and at least one of the first feature data and the second feature data are input to the disparity prediction network and processed to obtain the disparity information.

In some embodiments, the fused data is input to the disparity prediction network and processed to obtain the disparity information.

In some embodiments, feature extraction is performed on (k−1)th-level fused feature data obtained based on the cost volume to obtain kth-level feature data, the (k−1)th-level fused feature data is obtained by performing fusion processing on first-level feature data to (k−1)th-level feature data obtained based on the cost volume and k is an integer greater than 1, fusion processing is performed on the first-level feature data to kth-level feature data obtained based on the cost volume to obtain kth-level fused feature data, and the third feature data is obtained based on the kth-level fused feature data.

In some embodiments, the first-level feature data is obtained by performing feature extraction on the cost volume, or obtained by performing matching processing on the fused data or obtained by performing fusion processing on feature data obtained by performing feature extraction on the cost volume and feature data obtained by performing feature extraction on at least one of the first feature data and the second feature data, etc. No limits are made thereto in the embodiment of the disclosure.

Second-level feature data is obtained by performing feature extraction on the first-level feature data, and third-level feature data is obtained by performing feature extraction on second-level fused feature data, the second-level fused feature data being obtained by performing fusion processing on the first-level feature data and the second-level feature data. By parity of reasoning, the kth-level feature data is obtained by performing feature extraction on the (k−1)th-level fused feature data, the (k−1)th-level fused feature data being obtained by performing fusion processing on the first-level feature data, and the (k−1)th-level feature data.

Figure 6:
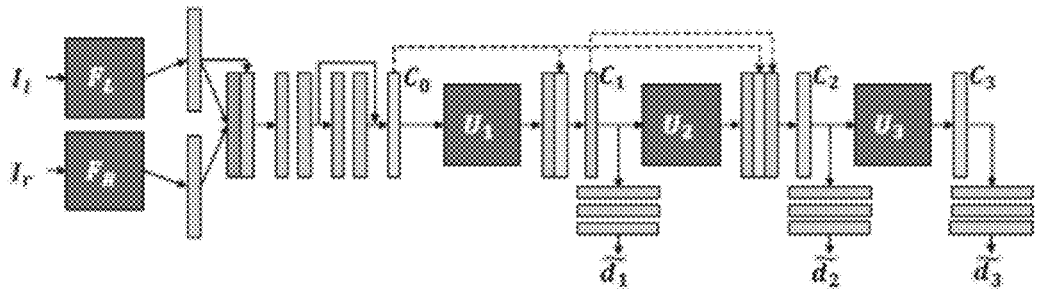
FIG. 6 is a schematic diagram of a binocular matching neural network according to an embodiment of the disclosure.

Referring to FIG. 6, FIG. 6 is a schematic diagram of a binocular matching neural network according to an embodiment of the disclosure. In an example illustrated in FIG. 6, it is assumed that the left-view image of an NIR image, the right-view image is a color image of an RGB type and the like, and an input of the binocular matching neural network is the first image and the second image, i.e., the left-view image and the right-view image. Ir represents the right-view image, for example, an original right-view image or a preprocessed right-view image, and Il represents the left-view image, i.e., an original left-view image or a preprocessed left-view image. Preprocessing may include, for example, one or more of size regulation, brightness regulation, rotation, correction processing and the like. No limits are made thereto in the embodiment of the disclosure.

As illustrated in FIG. 6, the binocular matching neural network includes four parts: a feature extraction part (or called a coder), a cost volume calculation part, a piling-up improvement part and a disparity regression part. The feature extraction part includes two feature extraction subnetworks FL and FR, and feature extraction is performed on the left-view image and the right-view image to obtain left-view feature data and right-view feature data respectively, FL and FR having different weight values.

Then, the cost volume is obtained based on the left-view feature data and the right-view feature data, the cost volume is connected with the left-view feature data to obtain a connected feature, and an initial feature map C0 is obtained based on the connected feature. In the example illustrated in FIG. 6, the connected feature is sequentially processed through four convolutional layers to obtain C0. However, no limits are made thereto in the embodiment of the disclosure.

C0 is input to a piling-up improvement network and processed to obtain improved feature maps C1, C2 and C3. For each stage, all low-level feature maps are connected and input to networks U1, U2 and U3 for processing, in some embodiments, the networks U1, U2 and U3 may be UNet-like networks of which depths are 2. An input feature is coded to a ¼ size at first, and then up-sampling is performed on the feature with ¼ size to obtain a feature map with an original size. A coded feature map may be connected with a deconvolution feature map to obtain an up-sampled feature map. However, no limits are made thereto in the embodiment of the disclosure.

Finally, C3 is input to a disparity regression subnetwork to obtain a predicted disparity.

In a neural network training stage, C1, C2 and C3 are adopted to obtain predicted disparities $\tilde{d}_1$, $\tilde{d}_2$ and $\tilde{d}_3$ respectively, and a disparity regression loss is obtained based on the predicted disparities $\tilde{d}_1$, $\tilde{d}_2$ and $\tilde{d}_3$.

In some embodiments, a network loss may be obtained based on the disparity regression loss and the feature regulation loss, and a network parameter of the binocular matching neural network may be adjusted based on the network loss. In some embodiments, the disparity regression loss and the feature regulation loss may have different weights, but no limits are made thereto in the embodiment of the disclosure.

It is to be understood that the abovementioned example is presented for those skilled in the art to understand the technical solutions of the embodiments of the disclosure better and not intended to form limits to the technical solutions provided in the embodiments of the disclosure.

In S300, a liveness detection result is obtained according to the disparity information.

In some examples, the liveness detection result may be obtained based on the disparity information in a practical application process of liveness detection. In some other examples, the method for liveness detection is implemented through a neural network. In such case, the neural network may be trained based on disparity information of a sample image pair, and liveness detection may be performed by using the trained neural network to obtain the liveness detection result. No limits are made thereto in the embodiment of the disclosure.

In some embodiments, the liveness detection result is obtained according to the first target region image, the second target region image and the disparity information. For example, the first target region image, the second target region image and the disparity information are input to the liveness detection neural network and processed to obtain the liveness detection result. Or, the first target region image, the second target region image and the disparity information are processed based on another liveness detection algorithm to obtain the liveness detection result.

In some embodiments, feature extraction is performed on the disparity information to obtain third liveness feature data, and the liveness detection result is obtained based on the third liveness feature data.

In some embodiments, fusion processing is performed on the third liveness feature data as well as the first liveness feature data extracted from the first target region image and/or the second liveness feature data extracted from the second target region image to obtain first fused feature data, and the liveness detection result is obtained based on the first fused feature data.

In some embodiments, the first liveness feature data and/or the second liveness feature data may be connected with the third liveness feature data. In some embodiments, the first liveness feature data and/or the second liveness feature data may be superimposed with the third liveness feature data according to channels to obtain the first fused feature data. Or, the first liveness feature data and/or the second liveness feature data have the same dimension with the third liveness feature data, and the first liveness feature data and/or the second liveness feature data and the third liveness feature data may be added element by element to obtain the first fused feature data, etc. A fusion processing manner is not limited in the embodiment of the disclosure.

In some embodiments, feature extraction is performed on the first target region image and the second target region image to obtain the first liveness feature data and the second liveness feature data respectively, and fusion processing is performed on the third liveness feature data, the first liveness feature data and the second liveness feature data to obtain the first fused feature data.

In some examples, the first target region image, the second target region image and the disparity information are input to the liveness detection neural network including three parallel network branches, the liveness detection neural network performs feature extraction processing on the input first target region image, second target region image and disparity information to obtain liveness feature data respectively, the liveness feature data obtained by the three branches is connected to obtain fused feature data, and then the fused feature data is processed through a classifier to obtain the liveness detection result.

In some embodiments, the liveness detection neural network detects whether the first target region image, the second target region image and the disparity information includes forged information or not; if any one of the three includes forged information, it is determined that the image pair including the first image and the second image does not pass liveness detection; and if the three include no forged information, it is determined that the image pair including the first image and the second image passes liveness detection. In such a manner, the first target region image and the second target region image are combined with the disparity information for liveness detection, so that the liveness detection neural network may obtain richer face information and is higher in liveness detection accuracy.

In some embodiments, the first liveness feature data and the second liveness feature data are obtained by performing feature extraction on the first image and the second image respectively, and implementation thereof is similar to the above descriptions and, for simplicity, will not be elaborated herein.

In some other embodiments, the liveness detection neural network is trained under the supervision of the disparity information, and liveness detection is performed by using the trained liveness detection neural network to obtain the liveness detection result.

In some examples, the liveness detection neural network may be trained in the following manner: feature extraction is performed on the first target region image and the second target region image through the liveness detection neural network to obtain the first liveness feature data and the second liveness feature data, and fusion processing is performed on the extracted first liveness feature data and second liveness feature data to obtain the third fused feature data; a network loss is determined based on the third fused feature data and the disparity information; and parameters of the liveness detection neural network are adjusted based on the network loss.

In some embodiments, feature extraction is performed on the first target region image and the second target region image through a feature extraction subnetwork in the liveness detection neural network respectively. For example, feature extraction is performed on the first target region image through a first CNN module in the liveness detection neural network to obtain a first feature map, and feature extraction is performed on the second target region image through a second CNN module in the liveness detection neural network to obtain a second feature map. Fusion processing is performed on the first feature map and the second feature map to obtain a third feature map, binocular matching is performed on the first target region image and the second target region image to obtain a disparity graph, the network loss of the liveness detection neural network is determined based on the third feature map and the disparity graph, and a parameter of at least one module in the first CNN module and the second CNN module is adjusted according to the network loss.

In such case, the first image and the second image are sample images in a sample image pair in a training set, and the liveness detection neural network is trained through multiple sample image pairs in the training set to obtain a trained liveness detection neural network. The trained liveness detection neural network and the liveness detection neural network before training may have the same network architecture and different network parameters, or the network architecture is also adjusted. No limits are made thereto in the embodiment of the disclosure.

In some embodiments, the liveness detection neural network may be trained based on the first image, the second image and the disparity information. Specific implementation may refer to the descriptions about training of the liveness detection neural network based on the first target region image, the second target region image and the disparity information and, for simplicity, will not be elaborated herein.

In some embodiments, after the liveness detection neural network is trained in the abovementioned manner, feature extraction is performed on a third image and fourth image in an image pair to be detected through the trained liveness detection neural network, fusion processing is performed on extracted feature data to obtain second fused feature data, and the second fused feature data is processed through the trained liveness detection neural network to obtain the liveness detection result.

In some embodiments, feature extraction is performed on a third target region image and fourth target region image corresponding to the image pair to be detected through the trained liveness detection neural network, fusion processing is performed on extracted feature data to obtain the second fused feature data, and the second fused feature data is processed through the trained liveness detection neural network to obtain the liveness detection result.

The third target region image and the fourth target region image are acquired from the third image and fourth image in the image pair to be detected. A specific processing process may refer to the above descriptions and, for simplicity, will not be elaborated herein.

In some embodiments, the liveness detection result may be obtained based on the first image, the second image and the disparity information. In some embodiments, binocular matching and liveness detection may be performed based on two images that are the same respectively. For example, binocular matching and liveness detection are performed based on the first image and the second image respectively. In another example, binocular matching and liveness detection are performed based on the first target region image and the second target region image respectively. However, no limits are made thereto in the embodiment of the disclosure.

In some embodiments, the liveness detection neural network extracts feature maps of the left and right images by using a dual-branch modality similar to the binocular matching neural network, but no limits are made thereto in the embodiment of the disclosure.

In the embodiment of the disclosure, the disparity is provided for the liveness detection neural network as a supervisory signal, and the feature data extracted by the liveness detection neural network is supervised through the disparity information to ensure that the extracted feature data learns the disparity information, so that the liveness detection accuracy of the liveness detection neural network is improved. In an application process of the liveness detection neural network, the disparity information is no more required to be acquired, so that enlargement of an original network structure and reduction of the liveness detection efficiency are avoided at the same time of improving the accuracy of the liveness detection network.

It is to be noted herein that, in the implementation, S100 and S200 are executed by a developer or a producer, and for training the liveness detection neural network, the developer or the producer may also execute S300 in a development or production process. No limits are made herein.

In some embodiments, after the liveness detection result is obtained, prompting information may further be output. For example, responsive to determining that the liveness detection result is that liveness detection succeeds, prompting information indicating that liveness detection succeeds is output and responsive to determining that the liveness detection result is that liveness detection fails, liveness detection is continued to be performed on another image pair until the number of processed image pairs reaches a certain number threshold value or total time for liveness detection reaches a certain time threshold value, and in such case, if an image pair passing liveness detection is yet not detected, the prompting information indicating that liveness detection fails is output. In some embodiments, the output prompting information may be a text, a vibration, a voice broadcast or preset prompt tone or an image. For example, a prompt tone indicating that liveness detection fails is three "beeps", and a prompt tone indicating that liveness detection succeeds is one "beep". No limits are made herein.

Figure 7:
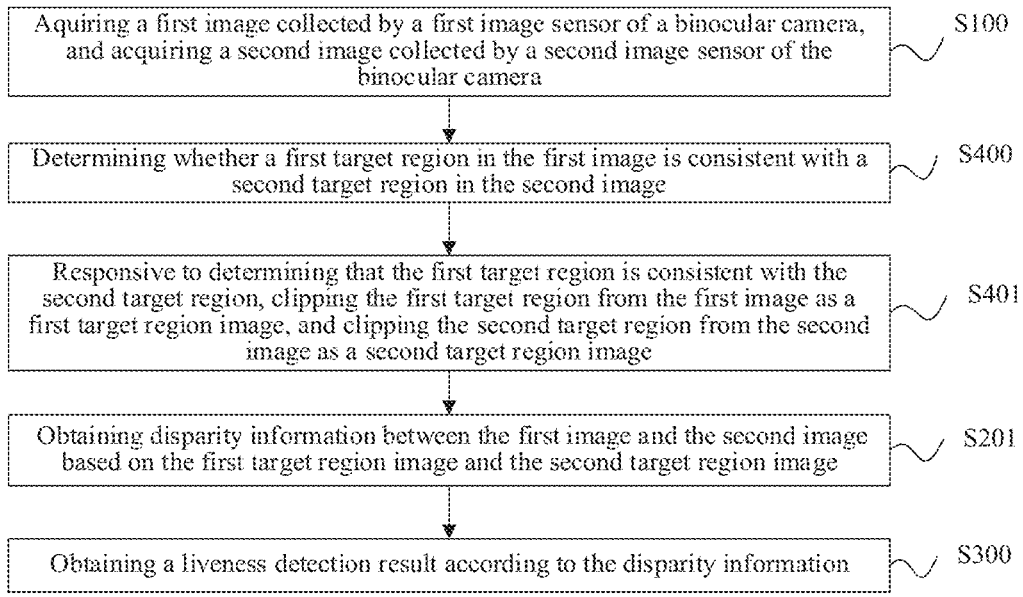
FIG. 7 is another flowchart of a method for liveness detection according to an embodiment of the disclosure.

Referring to FIG. 7, FIG. 7 is another flowchart of a method for liveness detection according to an embodiment of the disclosure. After the first target region and the second target region are obtained, the following steps are further included.

In S400, whether the first target region in the first image is consistent with the second target region in the second image or not is determined.

Herein, the target region may be obtained by performing target detection and/or key point detection on the first image or the second image. No limits are made thereto in the embodiment of the disclosure.

In S401, responsive to determining that the first target region is consistent with the second target region, the first target region image is clipped from the first image based on the first target region, and the second target region image is clipped from the second image based on the second target region.

In some embodiments, when a shooting range of the binocular camera includes multiple shot objects, the first image and the second image may simultaneously include images of the multiple shot objects. When target detection is performed on the first image and the second image, a shot object A may be detected in the first image, namely the first target region is an image region where the shot object A is located, a shot object B is detected in the second image, namely the second target region is an image region where the shot object B is located, and executing the subsequent liveness detection step based on the first target region and the second target region may not obtain an accurate liveness detection result.

Consistency of the first target region and the second target region may be detected to exclude the condition that the first target region and the second target region do not include the same shot object. Features of the image of the first target region and the image of the second target region may be extracted by using an image recognition technology, and the two extracted features are compared to detect the consistency of the first target region and the second target region. The image of the first target region and the image of the second target region may also be compared with preset data to detect the consistency of the first target region and the second target region. No limits are made herein.

In the embodiment of the disclosure, the consistency of the first target region and the second target region may be determined to ensure the accuracy of the liveness detection result of the target object.

In S201, the disparity information between the first image and the second image is obtained based on the first target region image and the second target region image.

Figure 8:
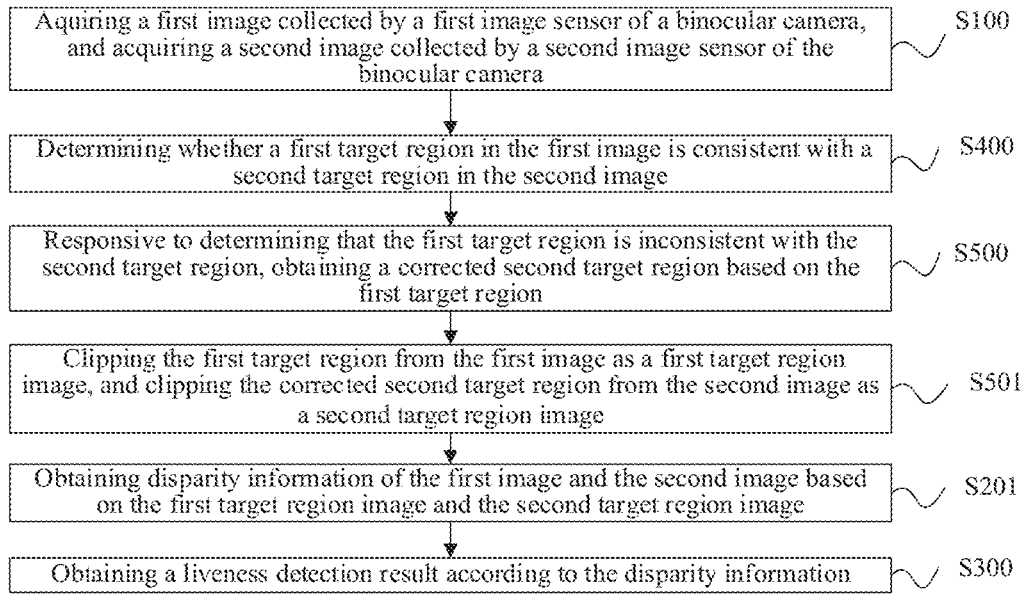
FIG. 8 is another flowchart of a method for liveness detection according to an embodiment of the disclosure.

Referring to FIG. 8, FIG. 8 is another flowchart of a method for liveness detection according to an embodiment of the disclosure.

In S500, responsive to determining that the first target region is inconsistent with the second target region, a corrected second target region is obtained based on the first target region.

In S501, the first target region image is clipped from the first image based on the first target region, and the second target region image is clipped from the second image based on the corrected second target region.

Inconsistency of the first target region is inconsistent with the second target region may bring the problem that the subsequent liveness detection result of the target object is inaccurate. When the first target region is inconsistent with the second target region, the corrected second target region may be obtained based on the first target region, the corrected second target region being consistent with the first target region. For example, target object detection and/or key point detection may be performed on the second image again according to the target object in the first target region to obtain the second target region.

In some embodiments, the corrected second target region is consistent with the first target region. More accurate disparity information and liveness detection result may be obtained according to the first target region and the corrected second target region.

In some embodiments, in the method for liveness detection, the operation that the corrected second target region is obtained based on the first target region includes that: a corresponding region of the first target region in the second image is determined, and the corresponding region is determined as the corrected second target region.

In S201, the disparity information between the first image and the second image is obtained based on the first target region image and the second target region image.

In some embodiments, the second target region may be corrected based on parameters of the first image sensor and the second image sensor, or the second target region may be corrected based on another manner. No limits are made thereto in the embodiment of the disclosure.

In some embodiments, the method further includes that: whether the image pair including the first image and the second image meets a frame selection condition or not is determined; and responsive to determining that the image pair including the first image and the second image meets the frame selection condition, the liveness detection flow is executed on the first image and the second image.

In some embodiments, the first image and the second image may be judged for the frame selection condition respectively, and a judgment result of the image pair including the first image and the second image is determined in combination with judgment results of the first image and the second image. In some other embodiments, only the first image or the second image is judged for the frame selection condition, and the judgment result of the image pair including the first image and the second image is determined in combination with the judgment result of the first image or the second image. No limits are made thereto in the embodiment of the disclosure.

In some embodiments, the frame selection condition includes one or any combination of the following conditions.

The target object is detected in the first image and/or the second image; the target object detected in the first image is in a set region of the first image and/or the target object detected in the second image is in a set region of the second image; completeness of the target object detected in the first image and/or the second image meets a preset condition; a proportion of the target object detected in the first image in the first image is higher than a proportion threshold value and/or a proportion of the target object detected in the second image in the second image is higher than the proportion threshold value; a resolution of the first image and/or the second image is higher than a resolution threshold value; and an exposure of the first image and/or the second image is higher than an exposure threshold value.

In some embodiments, frame selection may be performed based on another factor. No limits are made thereto in the embodiment of the disclosure.

In some embodiments, the method further includes that: under the condition that the image pair including the first image and the second image does not meet the frame selection condition, whether a next image pair in a video stream meets the frame selection condition or not is determined; and under the condition that a preset time period is reached or a preset number of image pairs are processed and no image pair meeting the frame selection condition is found in the video stream, the video stream is determined as a forged video stream.

In some embodiments, at least one pair of images are selected from the video stream as images to be detected through the frame selection operation, a pair of images simultaneously shot by the binocular camera and having relatively high image quality being required to be selected as the images to be detected, and whether the at least one pair of images to be detected include forged information or not is detected. The image quality may be evaluated through one or more factors such as completeness, face orientation, resolution and brightness of a target. One or more pairs of images with best indexes are selected from a complete video to be detected according to a preset criterion, or one or more pairs of images are selected from different interaction modules respectively. No limits are made thereto in the embodiment of the disclosure.

Figure 9:
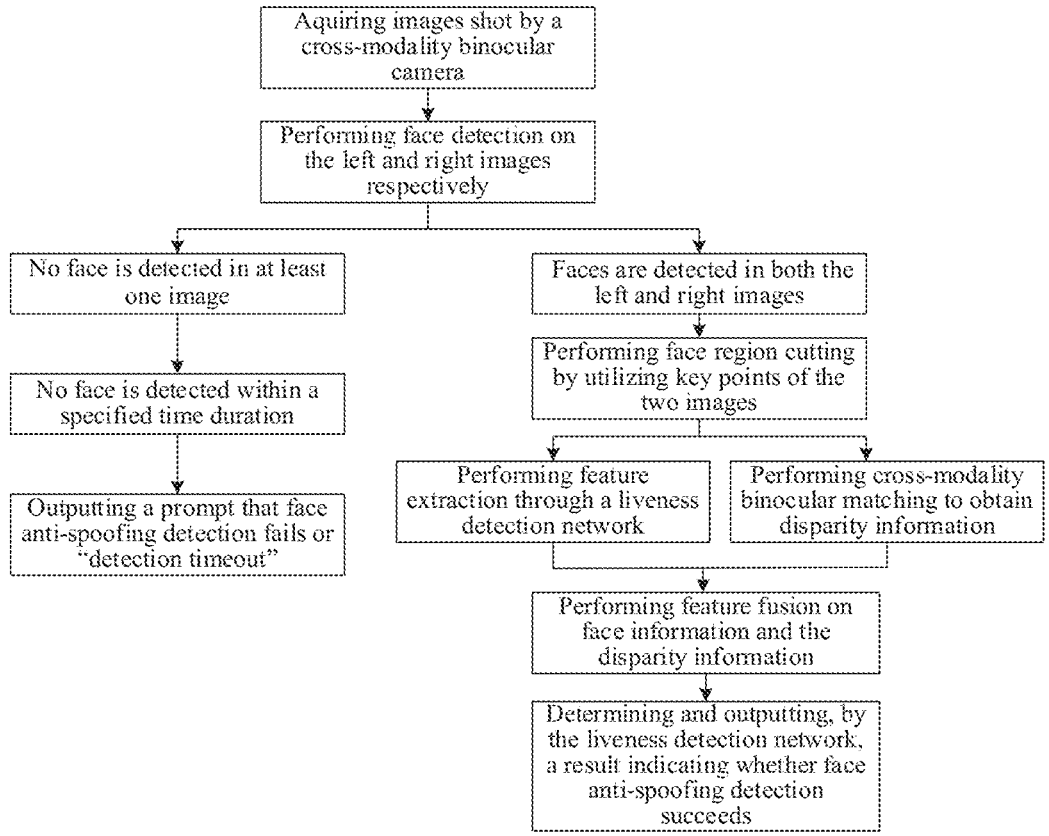
FIG. 9 is another flowchart of a method for liveness detection according to an embodiment of the disclosure.

In an example, referring to FIG. 9, FIG. 9 is another flowchart of a method for liveness detection according to an embodiment of the disclosure. After the images shot by the cross-modality binocular camera are acquired, face regions are detected in the left and right images respectively. If no face is detected in at least one image, frame selection is continued to be performed for face detection, and if the face regions may still not be simultaneously detected in the left and right images within a specified time duration, a forged face may directly be determined or "detection timeout" is output. If the face regions may be simultaneously detected, the cross-modality binocular matching-based liveness detection flow is continued.

In some embodiments, the method further includes that: at least one image in the first image and the second image is preprocessed, and the liveness detection flow is executed on the preprocessed first image and second image.

In some embodiments, preprocessing includes one or any combination of image type regulation, size regulation, z score standardization processing, brightness regulation or other processing.

In some embodiments, if types of the first image and the second image are different, an input interface file type may be unified to be a picture type file.

Figure 10:
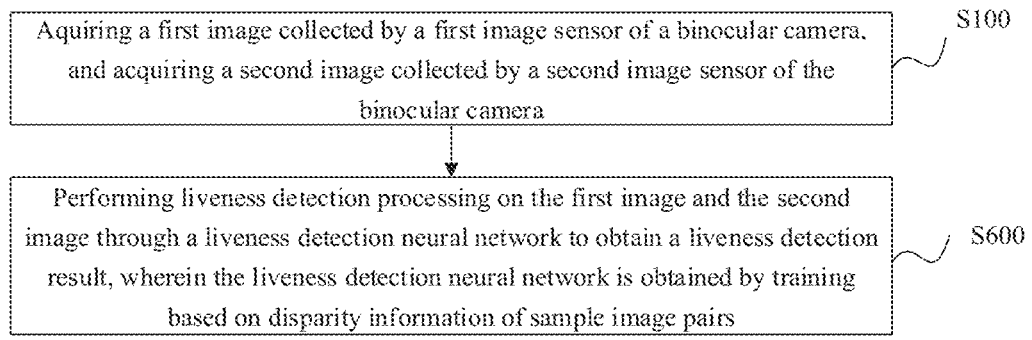
FIG. 10 is another flowchart of a method for liveness detection according to an embodiment of the disclosure.

Referring to FIG. 10, FIG. 10 is another flowchart of a method for liveness detection according to an embodiment of the disclosure. As illustrated in FIG. 10, the method for liveness detection includes the following steps.

S100 is specifically the same as S100 described above and will not be elaborated herein.

In S600, liveness detection processing is performed on a first image and a second image through a liveness detection neural network to obtain a liveness detection result, the liveness detection neural network being obtained by training based on disparity information of sample image pairs.

In a possible implementation, the operation that the first image and the second image are input to the liveness detection neural network and liveness detection processing is performed to obtain the liveness detection result includes that: through the liveness detection neural network, a first target region image of a target object is acquired from the first image, and a second target region image of the target object is acquired from the second image; and the liveness detection result is obtained based on the first target region image and the second target region image through the liveness detection neural network.

In a possible implementation, the operation that liveness detection processing is performed on the first image and the second image through the liveness detection neural network to obtain the liveness detection result includes that: the first target region image of the target object is acquired from the first image, and the second target region image of the target object is acquired from the second image; and the first target region image and the second target region image are input to the liveness detection neural network, and liveness detection processing is performed to obtain the liveness detection result.

According to the embodiment of the disclosure, the first image collected by the first image sensor of the binocular camera may be acquired, and the second image collected by the second image sensor of the binocular camera may be acquired; binocular matching processing is performed on the first image and the second image to obtain the disparity information between the first image and the second image; and the liveness detection result is obtained according to the disparity information. In the method for liveness detection, the disparity information predicted in a binocular matching algorithm is added, so that the liveness detection accuracy may be improved. By liveness detection, whether a face image includes forged information or not is detected, thereby judging whether the detected target object is a forged face or not. The trained liveness detection neural network may learn forged information in the disparity information, and the liveness detection accuracy may be improved.

For conveniently implementing the solutions of the embodiments of the disclosure better, the disclosure also correspondingly provides a device for liveness detection. Detailed descriptions will be made below in combination with the drawings.

Figure 11:
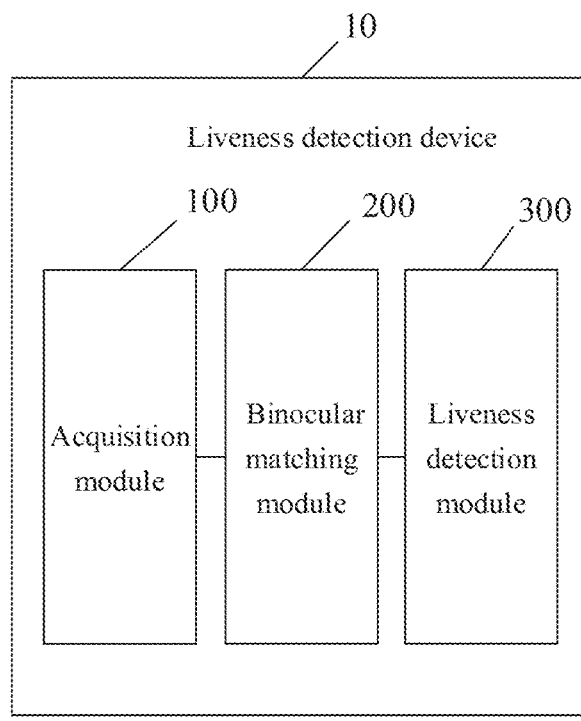
FIG. 11 is a structure diagram of a device for liveness detection according to an embodiment of the disclosure.

FIG. 11 is a structure diagram of a device for liveness detection according to an embodiment of the disclosure. The device for liveness detection may include an acquisition module 100, a binocular matching module 200 and a liveness detection module 300. The acquisition module 100 is configured to acquire a first image collected by a first image sensor of a binocular camera and acquire a second image collected by a second image sensor of the binocular camera. The binocular matching module 200 is configured to perform binocular matching processing on the first image and the second image to obtain disparity information between the first image and the second image. The liveness detection module 300 is configured to obtain a liveness detection result according to the disparity information.

Figure 12:
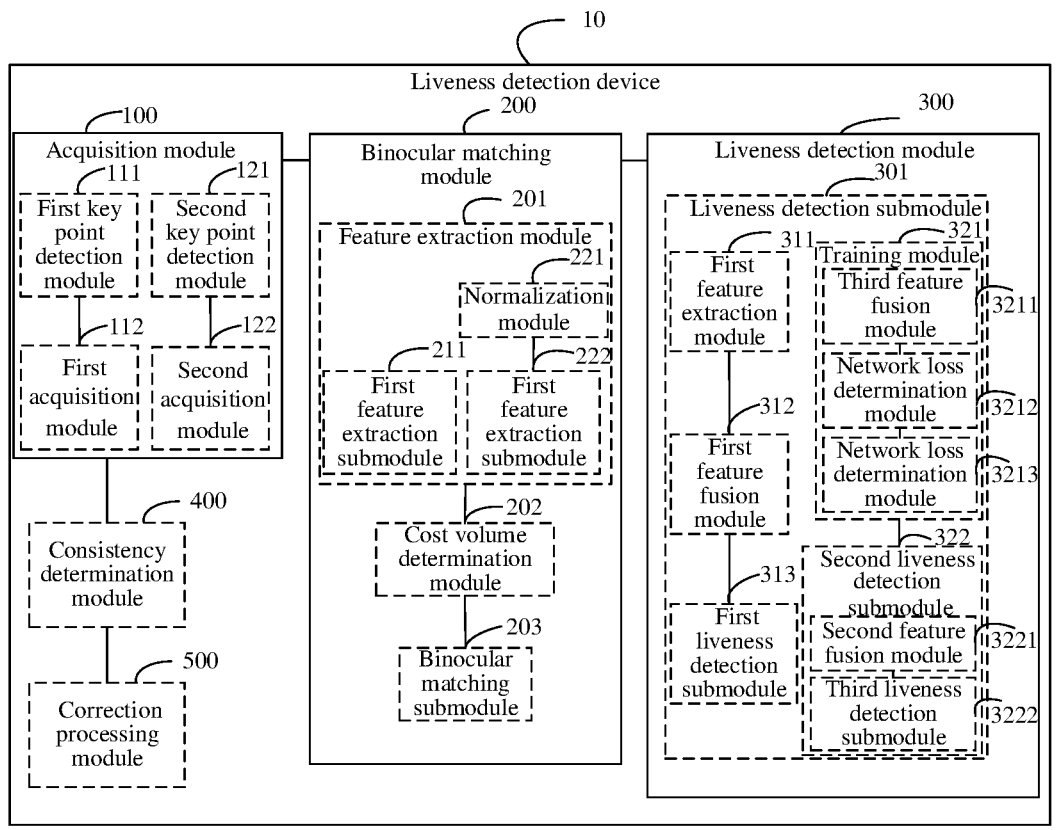
FIG. 12 is another structure diagram of a device for liveness detection according to an embodiment of the disclosure.

FIG. 12 is a structure diagram of a device for liveness detection according to an embodiment of the disclosure. The device for liveness detection may further include a consistency determination module 400 and a correction processing module 500. The consistency determination module 400 is configured to determine whether a first target region is consistent with a second target region or not. The correction processing module 500 is configured to, responsive to determining that the first target region is inconsistent with the second target region, obtain a corrected second target region based on the first target region. In some embodiments, the acquisition module 100 may include: a first target detection module 111, configured to perform target detection on the first image to obtain a first candidate region image corresponding to the target object; a first key point detection module 112, configured to perform key point detection on the first candidate region image to obtain first key point information; and a first image clipping module 113, configured to clip a first target region image of the target object from the first image based on the first key point information.

In some embodiments, the acquisition module 100 may include: a second target detection module 121, configured to perform target detection on the second image to obtain a second candidate region image corresponding to the target object; a second key point detection module 122, configured to perform key point detection on the second candidate region image to obtain second key point information; and a second image clipping module 123, configured to clip a second target region image of the target object from the second image based on the second key point information.

In some embodiments, the binocular matching module 200 includes: a feature extraction module 201, configured to perform feature extraction processing on the first target region image to obtain first feature data and perform feature extraction processing on the second target region image to obtain second feature data; and a disparity prediction module 202, configured to obtain the disparity information based on the first feature data and the second feature data.

The feature extraction module 201 may include a first feature extraction submodule 211, configured to perform feature extraction on the first target region image by using a first feature extraction subnetwork in a binocular matching neural network to obtain the first feature data and perform feature extraction on the second target region image by using a second feature extraction subnetwork in the binocular matching neural network to obtain the second feature data.

In some embodiments, the feature extraction module 201 may include: a normalization module 221, configured to perform normalization processing on the first target region image and the second target region image to enable a unified distribution of the normalized first target region image and second target region image respectively; and a second feature extraction submodule 222, configured to perform feature extraction on the normalized image by using a feature extraction subnetwork in the binocular matching neural network to obtain the first feature data and perform feature extraction on the normalized second image by using the feature extraction subnetwork to obtain the second feature data.

In some embodiments, the liveness detection module 300 includes a liveness detection submodule 301, configured to obtain the liveness detection result according to the first target region image acquired from the first image, the second target region image acquired from the second image and the disparity information.

The liveness detection submodule 301 may include: a first feature extraction module 311, configured to perform feature extraction on the disparity information to obtain third liveness feature data; a first feature fusion module 312, configured to perform fusion processing on first liveness feature data extracted from the first target region image, second liveness feature data extracted from the second target region image and the third liveness feature data to obtain first fused feature data; and a first liveness detection submodule 313, configured to obtain the liveness detection result based on the first fused feature data.

In some embodiments, the liveness detection submodule 301 may include: a training module 321, configured to train a liveness detection neural network under the supervision of the disparity information; and a second liveness detection submodule 322, configured to perform liveness detection by using the trained liveness detection neural network to obtain the liveness detection result.

The second liveness detection submodule 322 may include: a second feature fusion module 3221, configured to perform feature extraction on a third image and fourth image in an image pair to be detected through the trained liveness detection neural network and perform fusion processing on extracted feature data to obtain second fused feature data; and a third liveness detection submodule 3222, configured to process the second fused feature data through the trained liveness detection neural network to obtain the liveness detection result.

In some embodiments, the training module 321 may include: a third feature fusion module 3211, configured to perform fusion processing on the first liveness feature data extracted from the first target region image and the second liveness feature data extracted from the second target region image through the liveness detection neural network to obtain third fused feature data; a network loss determination module 3212, configured to determine a network loss based on the third fused feature data and the disparity information; and a network regulation module 3213, configured to adjust a parameter of the liveness detection neural network based on the network loss.

Figure 13:
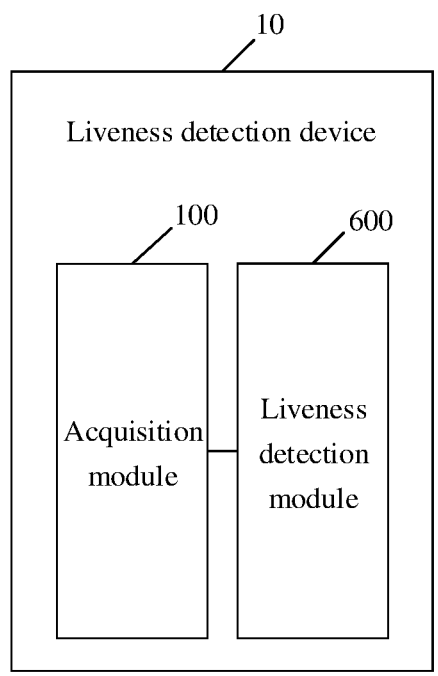
FIG. 13 is another structure diagram of a device for liveness detection according to an embodiment of the disclosure.

FIG. 13 is a structure diagram of a device for liveness detection according to an embodiment of the disclosure. The device for liveness detection may further include an acquisition module 100 and a liveness detection module 600.

The liveness detection module 600 is configured to perform liveness detection processing on a first image and a second image through a liveness detection neural network to obtain a liveness detection result, the liveness detection neural network being obtained by training based on obtained disparity information of a sample image pair.

The liveness detection module 600 is configured to input the first image and the second image to the liveness detection neural network and perform liveness detection processing to obtain the liveness detection result, the first image and the second image being face images.

The device further includes a binocular matching module.

The binocular matching module is further configured to acquire a first target region image of a target object from the first image and acquire a second target region image of the target object from the second image.

The liveness detection module 600 is configured to input the first target region image and the second target region image to the liveness detection neural network and perform liveness detection processing to obtain the liveness detection result.

The device further includes a third feature fusion module and a network loss determination module.

The third feature fusion module is configured to perform fusion processing on first liveness feature data extracted from the first image and second liveness feature data extracted from the second image through the liveness detection neural network to obtain third fused feature data.

The network loss determination module is configured to determine a network loss based on the third fused feature data and disparity information.

The liveness detection module 600 is configured to adjust a parameter of the liveness detection neural network based on the network loss. It is to be noted that the device for liveness detection 10 in the embodiment of the disclosure is the device for liveness detection in the embodiments illustrated in FIG. 2 to FIG. 10 and the function of each unit in the device for liveness detection 10 may correspondingly refer to the specific implementations of the embodiments illustrated in FIG. 2 to FIG. 10 in various method embodiments and will not be elaborated herein.

For conveniently implementing the solutions of the embodiments of the disclosure better, the disclosure also correspondingly provides a device for liveness detection. Detailed descriptions will be made below in combination with the drawings.

Figure 14:
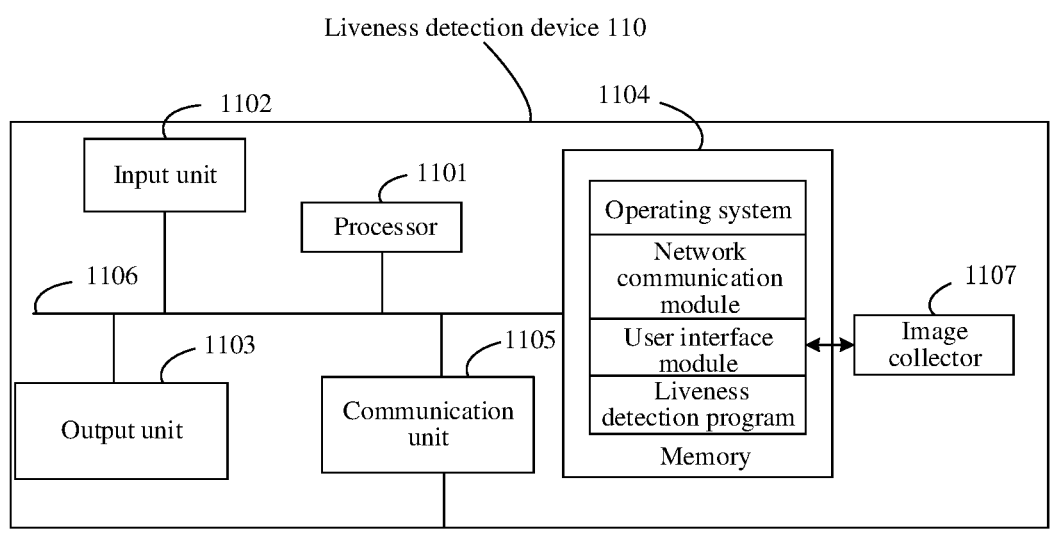
FIG. 14 is another structure diagram of a device for liveness detection according to an embodiment of the disclosure.

FIG. 14 is a structure diagram of a device for liveness detection according to an embodiment of the disclosure. The device for liveness detection 110 may include a processor 1101, an input unit 1102, an output unit 1103, a memory 1104, a communication unit 1105, a bus 1106 and an image collector 1107. The processor 1101, the input unit 1102, the output unit 1103, the memory 1104 and the communication unit 1105 may be connected with one another through the bus 1106. The image collector 1107 is connected with a user interface module. The memory 1104 may be a high-speed Random Access Memory (RAM) or may be a non-volatile memory, for example, at least one disk memory. Optionally, the memory 1104 may be at least one storage system far away from the processor 1101. The memory 1104 is configured to store an application program code and may include an operating system, a network communication module, the user interface module and a liveness detection program. The communication unit 1105 is configured for information interaction with an external unit. An image collected by the image collector 1107 is uploaded to the memory 1104 through the user interface module in the memory 1104. The processor 1101 is configured to call the program code to execute the following steps.

The image collected through the image collector 1107 is uploaded to the memory 1104 through the user interface module in the memory 1104, and then the processor 1101 acquires the image through the bus 1106. The image includes a first image collected by a first camera of a binocular photographic device and a second image collected by a second camera, and optical wavelengths that the first camera and the second camera may capture are different. It is to be noted that the binocular photographic device belongs to the image collector 1107.

Through the processor 1101, feature extraction is performed on the first image to obtain a first feature, and feature extraction is performed on the second image to obtain a second feature.

Binocular matching is performed on the first feature and the second feature through the processor 1101 to obtain disparity information.

Liveness detection is performed by taking a first target region image, a second target region image and the disparity information as an input of a method for liveness detection to obtain a liveness detection judgment result through the processor 1101.

The liveness detection judgment result is output through the output unit 1103.

It is to be noted that the device for liveness detection 110 in the embodiment of the disclosure is the device for liveness detection in the embodiments illustrated in FIG. 2 to FIG. 10, may specifically refer to the specific implementations of the embodiments illustrated in FIG. 2 to FIG. 10 in various method embodiments and will not be elaborated herein.

The method for liveness detection provided in the embodiments of the disclosure will be described below in combination with a specific example in detail.

In an example, an acquired picture or video including a face is collected by a cross-modality binocular camera. The cross-modality binocular camera includes a visible light camera and an infrared camera. By using the characteristic that the infrared camera in the binocular camera may not acquire copied face image information on a screen, the interference of forged information may be directly prevented in a subsequent detection flow. Multiple images are shot in field by the binocular camera. If file types of the images in a collected image pair are different, they are converted into images of the same type. For a video, it is also necessary to execute a frame selection operation to obtain one or more pairs of image frames, and then the images obtained by frame selection are stored for a next operation. The frame selection operation is executed to select at least one pair of images (a pair of images includes two images) from the video as images to be detected, the images to be detected are two images simultaneously shot by the binocular camera, and the image quality thereof meets a quality condition. For example, resolutions of the selected images reach a resolution threshold value. Optionally, the image quality may be evaluated through one or more of the following standards: whether a target object in the image is complete or not, for example, whether the face in the two images shot by the binocular camera is completely included in the images or not, the resolution of the image is relatively high, and the like. For such selection, indexes such as a face orientation, the resolution and brightness may be automatically detected through a set detection manner, and one or more pairs of images with best indexes are selected from a complete video to be detected according to a preset criterion, or one or more pairs of images are selected from different interaction modules respectively.

In the example, for the image obtained by the frame selection operation and the like, at least one of the following operations may further be executed.

Face detection: positions of face regions in the left and right images acquired by the cross-modality binocular camera are detected respectively, and coordinates of rectangular boxes of the face regions are returned; if no face is detected in at least one image, frame selection is continued to be performed for face detection, and the face region may still not be simultaneously detected in the left and right images within a specified time duration, a forged face may directly be determined or a prompt "detection timeout" is output; and if the face regions may be simultaneously detected, a subsequent flow is continued.

Face key point detection: coordinates of 106 key points of the face are extracted from the left and right face images acquired by face detection respectively.

Face region segmentation: a minimum rectangle including left and right faces is determined by using the left and right groups of coordinates of the key points of the faces, the rectangular face region is determined as a final face region, and two face images at the same position and with the same size are clipped from the left and right images.

Liveness detection is performed on the two clipped images with the same size.

The liveness detection flow will be described below in combination with a specific example in detail.

Two acquired face region images are determined as an input for detection and recorded as I1 and I2 respectively, and a disparity D of the input images is acquired. D is combined with I1 and I2 for binocular liveness detection. For the combination solution, two manners may be adopted, i.e., direct combination and indirect combination.

In the direct combination manner, the disparity D is input to a liveness detection network as an independent branch or independent channel of the liveness detection network, and in such a manner, three images including different face information are input to the deep neural network for liveness detection. For example, the liveness detection neural network is divided into three branches, feature modalityling is performed on left, right and disparity face regions respectively, after a feature of each part is extracted, three feature vectors are connected, and a connected feature vector is input to a unified anti-spoofing detection discriminator to obtain a result indicating whether the feature obtained by combining the two images and the disparity information includes forged information or not. If forged information is detected in any one of the three, it is determined that the image to be detected includes the forged information, and a prompt that face anti-spoofing detection fails is output; otherwise a prompt that face anti-spoofing detection succeeds is output.

In the indirect combination manner, the disparity D is provided for the liveness detection network as a supervisory signal in a training process. A face feature extracted by the liveness detection network is supervised through the disparity D to force the extracted face feature to learn face disparity information in the disparity D. Liveness detection judgment is performed by using the feature including the disparity information, so that the liveness detection accuracy is improved. For example, feature maps of the left and right images are extracted by using a dual-branch modality, after the two feature maps are connected, a disparity graph D obtained by binocular matching is input as a supervisory signal, and a feature of the supervisory signal is simultaneously learned, so that the feature map obtains the feature fused with the left and right face images and the disparity graph after training based on a large amount of data. The feature map is input to the anti-spoofing detection discriminator to obtain the result indicating whether there is forged information or not. In an application process of the liveness detection network, two face region images are input and the disparity is not required to be additionally input, so that enlargement of an original network structure and prolonging of running time of the network are avoided at the same time of improving the accuracy of the liveness detection network.

Those of ordinary skill in the art should understand that all or part of the flows in the method of the abovementioned embodiment may be completed through related hardware instructed by a computer program, the program may be stored in a computer-readable storage medium, and when the program is executed, the flows of various method embodiments may be included. The storage medium may be a U disk, magnetic disk, an optical disk, a Read-Only Memory (ROM), a RAM or the like.

The disclosure may be a system, a method and/or a computer program product. The computer program product may include a computer-readable storage medium, in which a computer-readable program instruction configured to enable a processor to implement each aspect of the disclosure is stored.

The computer-readable storage medium may be a physical device capable of retaining and storing an instruction used by an instruction execution device. For example, the computer-readable storage medium may be, but is not limited to, an electric storage device, a magnetic storage device, an optical storage device, an electromagnetic storage device, a semiconductor storage device or any appropriate combination thereof. More specific examples (non-exhaustive list) of the computer-readable storage medium include a portable computer disk, a hard disk, a RAM, a ROM, an Erasable Programmable ROM (EPROM) (or a flash memory), a Static ROM (SRAM), a Compact Disc Read-Only Memory (CD-ROM), a Digital Video Disk (DVD), a memory stick, a floppy disk, a mechanical coding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or, may be connected to an external computer (for example, connected by an Internet service provider through the Internet). In some embodiments, an electronic circuit such as a programmable logic circuit, a Field Programmable Gate Array (FPGA) or a Programmable Logic Array (PLA) may be customized by using state information of a computer-readable program instruction, and the electronic circuit may execute the computer-readable program instruction, thereby implementing each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating steps are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method and computer program product according to multiple embodiments of the disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may be realized in a sequence different from those marked in the drawings. For example, two continuous blocks may actually be executed substantially concurrently or may be executed in a reverse sequence sometimes, Which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

The above is only the preferred embodiment of the disclosure and, of course, not intended to limit the scope of the disclosure. Therefore, equivalent variations made according to the claims of the disclosure also fall within the scope of the disclosure.

The invention claimed is:

1. A method for liveness detection, comprising:
acquiring a first image collected by a first image sensor of a binocular camera, and acquiring a second image collected by a second image sensor of the binocular camera;
performing binocular matching processing on the first image and the second image to obtain disparity information between the first image and the second image; and
obtaining a liveness detection result according to the disparity information,
wherein obtaining the liveness detection result according to the disparity information comprises:
training a liveness detection neural network with the disparity information as supervision; and
performing liveness detection by using the trained liveness detection neural network to obtain the liveness detection result.

2. The method of claim 1, wherein
a modality of the first image is different from a modality of the second image.

3. The method of claim 1, wherein performing binocular matching processing on the first image and the second image to obtain the disparity information between the first image and the second image comprises:
acquiring a first target region image of a target object from the first image, and acquiring a second target region image of the target object from the second image; and
obtaining the disparity information between the first image and the second image based on the first target region image and the second target region image.

4. The method of claim 3, wherein obtaining the disparity information between the first image and the second image based on the first target region image and the second target region image comprises:
performing feature extraction processing on the first target region image to obtain first feature data, and performing feature extraction processing on the second target region image to obtain second feature data; and
obtaining the disparity information based on the first feature data and the second feature data.

5. The method of claim 4, wherein performing feature extraction processing on the first target region image to obtain the first feature data and performing feature extraction processing on the second target region image to obtain the second feature data comprises:
performing feature extraction on the first target region image by using a first feature extraction subnetwork in a binocular matching neural network to obtain the first feature data, and performing feature extraction on the second target region image by using a second feature extraction subnetwork in the binocular matching neural network to obtain the second feature data.

6. The method of claim 4, wherein performing feature extraction processing on the first target region image to obtain the first feature data and performing feature extraction processing on the second target region image to obtain the second feature data comprises:
performing normalization processing on the first target region image and the second target region image respectively, to enable the normalized first target region image and the normalized second target region image to have a unified distribution; and
performing feature extraction on the normalized first target region image by using a feature extraction subnetwork in a binocular matching neural network to obtain the first feature data, and performing feature extraction on the normalized second target region image by using the feature extraction subnetwork to obtain the second feature data.

7. The method of claim 1, wherein obtaining the liveness detection result according to the disparity information comprises:
obtaining the liveness detection result according to a first target region image acquired from the first image, a second target region image acquired from the second image and the disparity information.

8. The method of claim 7, wherein obtaining the liveness detection result according to the first target region image acquired from the first image, the second target region image acquired from the second image and the disparity information comprises:
performing feature extraction on the disparity information to obtain third liveness feature data;
performing fusion processing on first liveness feature data extracted from the first target region image, second liveness feature data extracted from the second target region image and the third liveness feature data to obtain first fused feature data; and
obtaining the liveness detection result based on the first fused feature data.

9. The method of claim 1, wherein the first image sensor or the second image sensor comprises one of: a visible light sensor, a near infrared sensor or a dual-channel sensor.

10. A computer-readable storage medium having stored computer-readable instructions that when called by a processor, enable the processor to execute the method of claim 1.

11. A method for liveness detection, comprising:
acquiring a first image collected by a first image sensor of a binocular camera and a second image collected by a second image sensor of the binocular camera; and
performing liveness detection processing on the first image and the second image through a liveness detection neural network to obtain a liveness detection result, wherein the liveness detection neural network is obtained by training with disparity information of sample image pairs as supervision.

12. The method of claim 11, wherein performing liveness detection processing on the first image and the second image through the liveness detection neural network to obtain the liveness detection result comprises:
performing liveness detection processing by inputting the first image and the second image to the liveness detection neural network to obtain the liveness detection result, the first image and the second image being face images.

13. The method of claim 12, wherein the liveness detection neural network is trained by:
performing fusion processing on first liveness feature data extracted from the first image and second liveness feature data extracted from the second image through the liveness detection neural network to obtain third fused feature data;
determining a network loss based on the third fused feature data and the disparity information; and
adjusting parameters of the liveness detection neural network based on the network loss.

14. The method of claim 11, further comprising:
acquiring a first target region image of a target object from the first image, and acquiring a second target region image of the target object from the second image, wherein
performing liveness detection processing on the first image and the second image through the liveness detection neural network to obtain the liveness detection result comprises:
performing liveness detection processing by inputting the first target region image and the second target region image to the liveness detection neural network to obtain the liveness detection result.

15. A device for liveness detection, comprising a processor and a memory, wherein the memory is configured to store computer program codes, and the processor is configured to call the computer program codes to:
acquire a first image collected by a first image sensor of a binocular camera and acquire a second image collected by a second image sensor of the binocular camera;
perform binocular matching processing on the first image and the second image to obtain disparity information between the first image and the second image; and
obtain a liveness detection result according to the disparity information,
wherein obtaining the liveness detection result according to the disparity information comprises:
training a liveness detection neural network with the disparity information as supervision; and
performing liveness detection by using the trained liveness detection neural network to obtain the liveness detection result.

16. The device of claim 15, wherein
a modality of the first image is different from a modality of the second image.

17. The device of claim 15, wherein the processor is further configured to call the computer program codes to:
acquire a first target region image of a target object from the first image and acquire a second target region image of the target object from the second image; and
obtain the disparity information between the first image and the second image based on the first target region image and the second target region image.

18. The device of claim 17, wherein the processor is further configured to call the computer program codes to:
perform feature extraction processing on the first target region image to obtain first feature data and perform feature extraction processing on the second target region image to obtain second feature data; and
obtain the disparity information based on the first feature data and the second feature data.

19. The device of claim 18, wherein the processor is further configured to call the computer program codes to:
perform feature extraction on the first target region image by using a first feature extraction subnetwork in a binocular matching neural network to obtain the first feature data and perform feature extraction on the second target region image by using a second feature extraction subnetwork in the binocular matching neural network to obtain the second feature data.

* * * * *